United States Patent [19]

Cheng et al.

[11] Patent Number: 5,165,916
[45] Date of Patent: Nov. 24, 1992

[54] METHOD FOR PRODUCING CARBIDE PRODUCTS

[75] Inventors: Paul J. Cheng, Bartlesville, Okla.; Kenneth E. Inkrott, Houston, Tex.

[73] Assignee: Phillips Petroleum Company, Bartlesville, Okla.

[21] Appl. No.: 416,161

[22] Filed: Oct. 2, 1989

[51] Int. Cl.$^5$ .............................................. C01B 31/36
[52] U.S. Cl. ..................................... 423/346; 423/337
[58] Field of Search ............... 423/439, 440, 291, 345, 423/346, 337

[56] References Cited

U.S. PATENT DOCUMENTS

| | | | |
|---|---|---|---|
| 2,614,946 | 10/1952 | Proudfoot | 117/100 |
| 2,632,713 | 3/1953 | Krejci | 106/307 |
| 3,025,192 | 3/1962 | Lowe | 148/33 |
| 3,085,863 | 4/1963 | Prener | 23/208 |
| 3,161,473 | 12/1964 | Pultz | 23/208 |
| 3,205,042 | 9/1965 | Jacobson | 23/308 |
| 3,253,886 | 5/1966 | Lamprey et al. | 23/134 |
| 3,275,722 | 9/1966 | Popper | 264/65 |
| 3,306,705 | 2/1967 | Leineweber et al. | 23/208 |
| 3,340,020 | 9/1967 | Neuenschwander et al. | 23/349 |
| 3,346,338 | 10/1967 | Latham | 23/208 |
| 3,363,980 | 1/1968 | Kirov | 423/337 |
| 3,368,871 | 2/1968 | O'Conner et al. | 23/208 |
| 3,399,980 | 9/1968 | Bourdeau | 23/345 |
| 3,485,591 | 12/1969 | Evans et al. | 23/208 |
| 3,486,913 | 12/1969 | Zirngibl et al. | 423/337 |
| 3,663,283 | 5/1972 | Hebert et al. | 423/337 |
| 3,839,542 | 10/1974 | Chase | 423/346 |
| 3,848,062 | 11/1974 | Steiger et al. | 423/440 |
| 3,979,500 | 9/1976 | Sheppard et al. | 423/289 |
| 4,133,689 | 1/1979 | Stroke | 106/44 |
| 4,162,167 | 7/1979 | Enomoto et al. | 106/44 |
| 4,188,368 | 2/1980 | Wolf | 423/350 |
| 4,217,335 | 8/1980 | Sasaki et al. | 423/345 |
| 4,248,844 | 2/1981 | Ramsey, Jr. et al. | 423/345 |
| 4,283,375 | 8/1981 | Horne, Jr. et al. | 423/345 |
| 4,284,612 | 8/1981 | Horne, Jr. et al. | 423/345 |
| 4,341,749 | 7/1982 | Iya et al. | 423/349 |
| 4,342,837 | 8/1982 | Suzuki et al. | 501/90 |
| 4,364,974 | 12/1982 | Gert | 427/213 |
| 4,377,563 | 3/1983 | Seimiya | 423/345 |
| 4,419,336 | 12/1983 | Kuriakose | 423/345 |
| 4,435,476 | 3/1984 | Phillips et al. | 428/412 |
| 4,482,669 | 11/1984 | Dietmar et al. | 524/442 |

(List continued on next page.)

FOREIGN PATENT DOCUMENTS

| | | | |
|---|---|---|---|
| 1214309 | 11/1986 | Canada . | |
| 44903 | 2/1982 | European Pat. Off. | 423/337 |
| 0111008 | 6/1984 | European Pat. Off. . | |
| 0101000 | 2/1980 | Japan | 423/345 |

OTHER PUBLICATIONS

Day, R. J., P. L. Walka and C. C. Wright, "The Carbon-Oxygen Reaction at High Temperature," In *Industrial Carbon and Graphite* (London, Society of Chemical Industry, 1958), p. 348.

Haslam, Robert T. and Robert P. Russell, *Fuels and Their Combustion*, N.Y., McGraw-Hill, 1926, pp. 318-322.

(List continued on next page.)

Primary Examiner—Michael Lewis
Assistant Examiner—Stuart L. Hendrickson
Attorney, Agent, or Firm—William R. Sharp

[57] ABSTRACT

A method is provided for producing a carbide compound, such as silicon carbide. A reactor is provided which has a chamber defined therein which is divided into a combustion zone and a reaction zone. A combustible mixture comprising carbon monoxide and an oxidant is injected into the combustion zone and accordingly combusted to form hot combustion products. At least one reactant is injected at the boundary between the zones so as to be carried into the reaciton zone by the combustion products and react to produce a precursor product powder comprising an oxide, such as silicon dioxide, and carbon. This precursor product powder is heated in an inert atmosphere to yield the desired carbide compound.

10 Claims, 2 Drawing Sheets

U.S. PATENT DOCUMENTS

| | | | |
|---|---|---|---|
| 4,500,504 | 2/1985 | Yamamoto | 423/345 |
| 4,504,453 | 3/1985 | Tanaka et al. | 423/345 |
| 4,521,393 | 6/1985 | Saito et al. | 423/344 |
| 4,525,335 | 6/1985 | Tanaka et al. | 423/344 |
| 4,535,007 | 8/1985 | Cannady | 427/226 |
| 4,543,344 | 9/1985 | Cannady | 501/92 |
| 4,548,798 | 10/1985 | Rice | 423/263 |
| 4,571,331 | 2/1986 | Endou et al. | 423/345 |
| 4,591,492 | 5/1986 | Tanaka et al. | 423/345 |
| 4,604,273 | 8/1986 | Czupryna et al. | 423/344 |
| 4,622,007 | 11/1986 | Gilman | 432/13 |
| 4,640,830 | 2/1987 | Arakawa | 423/346 |
| 4,668,642 | 5/1987 | Busaiski | 501/88 |
| 4,719,095 | 1/1988 | Abe et al. | 423/346 |
| 4,752,456 | 6/1988 | Yoda et al. | 423/439 |
| 4,757,035 | 7/1988 | Dancy et al. | 501/88 |

OTHER PUBLICATIONS

*North American Combustion Handbook*, 2nd ed., Cleveland, North American Mfg. Co., 1978, pp. 232–251.

*Kirk–Othmer Encyclopedia of Chemical Technology*, (1980 ed.), vol. 11, pp. 821, 832–835.

Edwards, John B. *Combustion* Ann Arbor, Mich., Ann Arbor Science Publishers, Inc., 1974, pp. 7, 14, 149–151.

Walker, P. L., Jr., ed., *Chemistry and Physics of Carbon*, N.Y., Marcel Dekker, Inc., 1965, pp. 204–229.

PhilNews, Phillips Petroleum Company, vol. 12, No. 1, (1987), pp. 5 and 6.

*Ceramic Industry*, vol. 104, No. 1, (Jan., 1985), pp. 54 and 56.

Richerson, D. W. "What are Ceramics"]*Chemical Engineering*, vol. 20, No. 19 (Sep. 1982), pp. 123, 124, 126.

METHOD FOR PRODUCING CARBIDE PRODUCTS

BACKGROUND OF THE INVENTION

This invention relates to a method of producing carbide products, such as silicon carbide.

Silicon carbide powder as well as other carbide powders are useful in the fabrication of highly stressed ceramic parts, such as those employed in heat engines, turbo-charger rotors and heat exchangers. Such parts are fabricated by consolidating the carbide powder into the desired shape, followed by sintering the consolidated part at temperatures of about 2,000° C. In order to fabricate parts having acceptable mechanical strength, it is generally desirable to use a finely divided powder made up of highly uniform, submicron particles.

Heretofore, the primary method of making silicon carbide involves electrically heating a mixture of solid carbon and silica (silicon dioxide, i.e. sand). Large chunks are produced by this technique which must be subjected to mechanical grinding to reduce the particles to the necessary submicron diameters. Such grinding adds undesirable metal impurities to the product, requires excessive energy and is also time consuming.

SUMMARY OF THE INVENTION

It is, therefore, an object of the invention to provide a method of making carbides, such as silicon carbide, which produces submicron particles which do not require any grinding for size reduction and which are suitable for sintering into high strength parts.

The above object is realized by a method for producing a carbide compound which is a compound of a first elemental component and a second, carbon component which comprises the steps of: providing a reactor having a chamber defined therein and longitudinally separated upstream and downstream ends, wherein the chamber comprises a combustion zone and a reaction zone such that the combustion zone longitudinally extends from the upstream end to a boundary between the zones and such that the reaction zone longitudinally extends from the boundary to the downstream end; establishing a flow of a combustible mixture in the combustion zone so as to generally flow in a direction toward the reaction zone, wherein the combustible mixture comprises a mixture of carbon monoxide and an oxygen-containing oxidant; combusting the combustible mixture in the combustion zone to produce hot combustion products; injecting at least one reactant into the chamber at the boundary such that the hot combustion products carry the reactant(s) in the reaction zone toward the downstream end, wherein temperature conditions in at least a portion of the reaction zone are at least about 700° C. and wherein the reactant(s) reacts in the reaction zone to produce a precursor product powder comprising an intimate mixture of carbon and an oxide of the first elemental component; heating the precursor product powder at a temperature of about 1300° C. to about 2400° C. in a substantially inert atmosphere and for a sufficient time to react the oxide and carbon to produce the carbide compound.

DETAILED DESCRIPTION OF THE INVENTION

Figure 1:
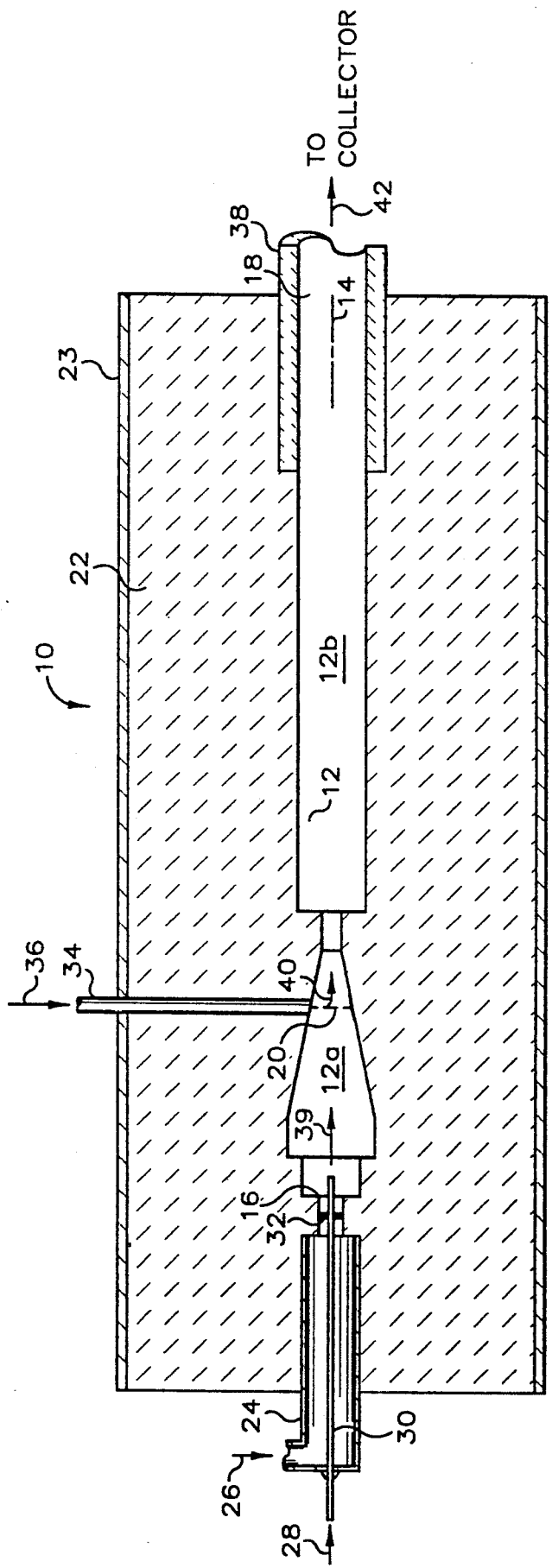
FIG. 1 is a cross-sectional view of one embodiment of a reactor for producing a precursor product powder in accordance with the invention.

A preferred embodiment of the invention will now be described with reference to the drawing.

Referring to FIG. 1, there is shown a cross-sectional view of a reactor 10 having defined therein a chamber 12 which has a longitudinal axis 14 and longitudinally separated upstream and downstream ends 16 and 18 respectively. Chamber 12 includes a combustion zone 12a and a reaction zone 12b situated such that the combustion zone 12a extends from upstream end 16 to an imaginary boundary 20 between the zones and such that the reaction zone 12b extends from boundary 20 to downstream end 18.

Chamber 12 is defined by a refractory material as indicated at 22, which is preferably castable alumina. Although not indicated in FIG. 1, the refractory material 22 can be separated into an inner layer capable of withstanding temperatures up to, for example, about 2000° C., and an outer layer of lower density refractory material rated to a temperature of, for example, about 1200° C. The refractory material 22 is preferably surrounded by a metallic, for example stainless steel, shell 23.

A metal tube 24 is mounted within the refractory material 22 at one end of reactor 10 so as to communicate with upstream end 16. Tube 24 functions to receive the components of a combustible mixture therethrough. Oxidant is injected into tube 24 as indicated at 26, and fuel is injected as indicated at 28 by means of a fuel tube 30 which is coaxially positioned within tube 24 so as to extend into combustion zone 12a. Reference character 32 simply denotes a support mechanism which assists in supporting and positioning fuel tube 30 within the apparatus and which has flow channels therethrough.

A nozzle 34 is also provided which extends through the refractory material 22 into chamber 12 so as to communicate with chamber 12. Reactants are injected through nozzle 34 as indicated at 36. As shown, the outlet end of nozzle 36 is positioned at boundary 20.

Also shown in FIG. 1 is a refractory, preferably precast alumina, tube which extends from reactor 10 so as to define downstream end 18 of chamber 12. Reactor product flows through tube 38 and is preferably cooled while flowing therethrough with the aid of cooling coils (not shown) surrounding tube 38. As indicated, tube 38 extends to an appropriate collector for collecting the product powder. The collector may be a filter bag, electrostatic precipitator or cyclone separator.

The illustrated and described apparatus can be used to make carbide precursor products in accordance with a preferred embodiment described below.

As used herein and in the appended claims, a carbide compound is defined as a compound of a first elemental component and a second, carbon component. In the illustrated embodiment, the first elemental component and the second, carbon component are derived from first and second reactants, respectively. Generally speaking, the first reactant includes the first elemental component and should be capable of reacting with an oxidizing species to produce an oxide of the first elemental component. The second reactant should be decomposable to carbon.

According to certain broad aspects of the invention, the first component as contained in the first reactant may be any element capable of combining with carbon to form a carbide compound. For example, the first component may be a metal such as tungsten, chromium, titanium, zirconium, molybdenum or iron. Halides of such metals are particularly suitable as the first reactant. Or, the first component may be a metalloid such as boron or silicon. As stated previously, silicon carbide is a very useful carbide compound. Ceramic parts can be made from silicon carbide powder which have excellent mechanical strength and heat resistance. Therefore, reactants having silicon as the first component are of particular interest in connection with the present invention.

Preferred silicon-containing reactants which are compounds of silicon include silane ($SiH_4$) and substituted silanes. As used herein and in the appended claims, a substituted silane can be generally expressed by the formula SiABCD where each of A, B, C and D can be any element or combination of elements as long as at least one of A, B, C and D is not hydrogen, and where A, B, C and D can be the same or different. For example, any one of A, B, C and D can be selected from hydrogen, a halogen, an oxygen-containing group (i.e. $OSi(CH_3)_3$), a nitrogen-containing group (i.e. $NHSi(CH_3)_3$), an alkyl group, an aryl group, a silyl group, or a group containing multiple silicon atoms. Examples of such substituted silanes include: alkyl silanes such as methylsilane (($CH_3)SiH_3$), dimethylsilane (($CH_3)_2SiH_2$), trimethylsilane (($CH_3)_3SiH$) and tetramethylsilane ($Si(CH_3)_4$); halogenated silanes such as dichlorosilane ($H_2SiCl_2$); halogenated methylsilanes such as trimethyl silicon bromide (($CH_3)_3SiBr$) and dichlorodimethylsilane (($CH_3)_2SiCl_2$); siloxanes such as hexamethyldisiloxane (($CH_3)_3SiOSi(CH_3)_3$); silazanes such as hexamethyldisilazane (($CH_3)_3SiNHSi(CH_3)_3$); and silicon halides such as silicon tetrachloride ($SiCl_4$). Cyclic and polymeric silicon compounds are also within the scope of the invention. If desired, mixtures of any of the preceding silicon-containing compounds can be employed.

The second, carbon-containing reactant is preferably a $C_1$-$C_9$ carbon compound such as an alcohol or a hydrocarbon. Suitable alcohols include ethanol and propanol. A hydrocarbon is presently most preferred and can be selected, by way of example, from the following group: methane, ethane, propane, butane, pentane, hexane, heptane, octane, nonane, ethylene, propylene, acetylene, benzene, toluene, cyclopropane, cyclobutane, cyclopentane, cyclohexane, and mixtures thereof.

The fuel used in accordance with the present invention comprises carbon monoxide. Carbon monoxide has been found to be particularly well suited to formation of a ceramic precursor product powder, as will be explained further below, which is convertible to the desired carbide product. Furthermore, carbon monoxide is particularly advantageous as a fuel since various processes, such as certain refinery processes, produce carbon monoxide as a waste gas. Such waste gas can be conveniently utilized as a fuel in connection with the present invention to produce carbide products.

The oxidant is an oxygen-containing gas such as air or pure oxygen.

It is preferable to gradually heat the reactor to operating conditions before production of the precursor product powder begins. This assists in preventing thermal shock to the refractory material and avoids breakage of the refractory material. Such a preliminary preheating stage can be accomplished by flowing a fuel such as natural gas through fuel tube 30. An oxidant such as air is passed into and through tube 24 so as to enter combustion zone 12a at upstream end 16. The resulting combustible mixture is appropriately ignited to begin the preheating of the reactor. The natural gas flow is incrementally increased until a predetermined temperature less than the desired operating temperature is reached.

After the preliminary preheating stage described above, carbon monoxide replaces natural gas as the fuel. The carbon monoxide is injected with the oxidant into combustion zone 12a at upstream end 16. Thus, a flow of the resulting combustible mixture is established in combustion zone 12a which generally flows in a direction generally parallel to axis 14 and toward reaction zone 12b, as indicated at 39. The molar ratio of carbon monoxide to oxygen ($O_2$) is preferably in the range of about 1:1 to about 3:1. Temperature conditions in combustion zone 12a are typically in the range of about 1000° C. to about 1900° C.

The gaseous reactants are now injected through nozzle 34 and into chamber 12 at boundary 20, as indicated at 40, in a direction generally perpendicular to chamber axis 14 such that the hot combustion products formed from combustion of the fuel carry the reactants toward downstream end 18. In the illustrated embodiment, the first and second reactants are preferably premixed in a molar ratio to result in a silicon to carbon ratio of about 1:3 in the precursor powder produced by the reactor. If the first reactant is normally a liquid, the first reactant is placed in vapor form before injection into chamber 12 by, for example, passing the reactant through a heat exchanger which heats the reactant to a temperature necessary for vaporization.

Temperature conditions for at least a portion of reaction zone 12b are at least about 700° C., preferably in the range of about 800° C. to about 1600° C. Temperature conditions in the reactor can most conveniently be monitored by means of thermocouples positioned in chamber 12, or alternatively within the refractory material 22.

Pressure conditions in reaction zone 12b are preferably at or near atmospheric pressure, although other pressure conditions are within the scope of the invention.

In reaction zone 12b, a precursor product powder is formed which comprises an intimate mixture of carbon and an oxide of the first elemental component. For example, in the case of silicon as the first component of the first reactant, the precursor product powder comprises an intimate mixture of silicon dioxide and carbon. Particle diameters are less than 1 micron and are most typically less than 0.1 micron. Such product powder is passed through tube 38, as indicated at 42, so as to be cooled and is then collected by the collector.

The precursor product powder as collected from the reactor is now heated in an inert (i.e. argon gas) atmosphere at a temperature of about 1300° C. to about 2400° C., most preferably about 1500° C. to about 1800° C., for a sufficient time to react the oxide of the first element with carbon to produce the desired carbide compound. Typically, a heating time of at least about 15 minutes and preferably in the range of about 1 hour to about 2 hours is employed. In the case where silicon carbide is being produced, this step serves to react silicon dioxide with carbon to thereby remove oxygen as carbon monoxide and make the silicon available for reacting with free carbon to form silicon carbide.

The silicon tetrachloride was preheated to about 300° F. to place it in vapor form for injection into the reactor.

| Time | Flow Rates | | | | Temperatures (°C.)* | | |
|---|---|---|---|---|---|---|---|
| (Minutes) | Air (SCFH) | CO (SCFH) | $C_2H_4$ (SCFH) | $SiCl_4$ (cc/hr) | T1 | T2 | T3 |
| 0 | 150 | 70 | 2 | 306 | 1633 | 1525 | 1153 |
| 40 | 150 | 70 | 2 | 306 | 1632 | 1562 | 1194 |
| 51 | 150 | 70 | 2 | 306 | 1637 | 1569 | 1191 |
| 52 | 150 | 70 | 2 | 600 | NR | NR | NR |
| 70 | 150 | 70 | 2 | 600 | NR | NR | NR |
| 71 | 150 | 70 | 0 | 600 | NR | NR | NR |
| 90 | 150 | 70 | 0 | 600 | 1630 | 1592 | 1230 |

*NR indicates that no temperature reading was taken.

An additional purification step can be employed which serves to remove carbon from the carbide-containing product. According to such a purification step such product is heated in an oxygen-containing atmosphere at a temperature of about 600° C. to about 900° C., most preferably about 600° C. to about 700° C, over a period of at least about 15 minutes and most preferably for about 30 minutes to about 2 hours. This step burns off remaining carbons to yield a highly pure, final product.

Figure 2:
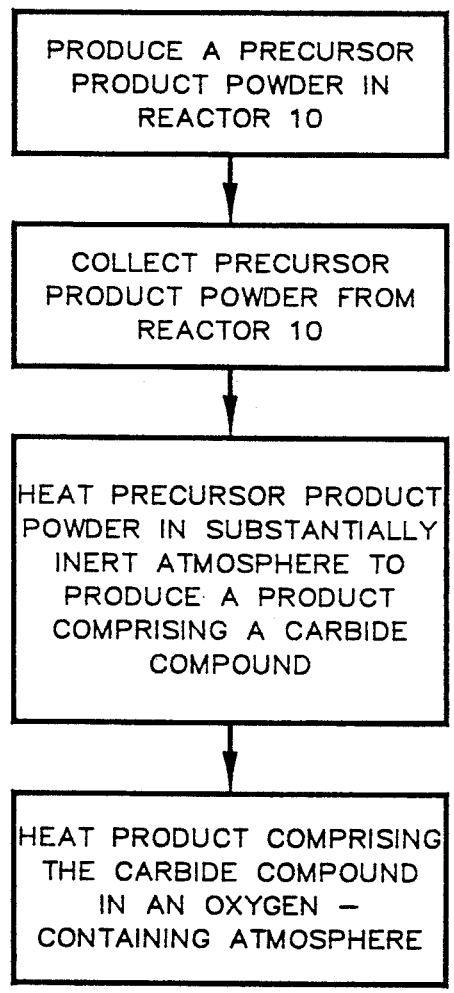
FIG. 2 is a flow diagram which outlines the steps of a preferred embodiment for producing a carbide-containing product in accordance with the invention.

The above steps for producing the carbide-containing product are outlined in the flow diagram of FIG. 2.

The carbide-containing product of the invention can be sintered into heat resistant, high strength parts in a conventional manner. For example, appropriate amounts of additives such as boron and carbon or yttrium oxide and aluminum oxide can be added to the product, followed by pressing of the product into a desired shape and heating at a temperature of about 1700° C. to about 2400° C.

It is to be understood that the above description pertains to a preferred embodiment of the invention, but that many variations and modifications are within the scope of certain aspects of the invention. For example, it is possible to employ only one reactant where that reactant is capable of contributing both the first elemental component and second, carbon component. One example of such a reactant is an alkyl silane such as tetramethylsilane.

EXAMPLE

This example is provided to further illustrate the invention and should not be construed to limit the invention in any manner.

The apparatus used in this example was substantially similar to the apparatus illustrated in FIG. 1. Important dimensions of the apparatus include the following: length of combustion zone 12a—5 inches; length of reaction zone 12b—20 inches; maximum diameter of combustion zone 12a—2½ inches; and maximum diameter of reaction zone 12b—2 inches.

The table set forth below summarizes the flow rates and temperature conditions at various times in a particular run. Pressure conditions in the reactor were approximately atmospheric. Thermocouples were placed at several different positions within chamber 12, including a first position 1 inch downstream from upstream end 16, a second position at boundary 20, and a third position about 7 inches downstream from boundary 20. Temperature readings were taken at each of these three positions and are designated in the table as T1, T2 and T3, respectively. As shown in the table, air and carbon monoxide made up the combustible mixture, and silicon tetrachloride and ethylene constituted the reactants.

The table indicates that flow rates of air and carbon monoxide (CO) were maintained constant through the run. Product powder was collected in a bag filter. At 51 minutes into the run, the collected product powder was taken from the bag filter and is hereafter designated as sample 1. At 52 minutes, the flow rate of silicon tetrachloride ($SiCl_4$) was increased to 600 cc/hr, and at 70 minutes sample 2 was taken from the bag filter. At 71 minutes, flow of ethylene was terminated while all other gas flows remained constant. Finally, at 90 minutes, the bag filter was emptied to yield sample 3.

Surface areas of the three samples were determined using liquid nitrogen according to ASTM D3037. Surface areas in units of $m^2$/gram were determined to be 236, 289 and 238 for samples 1, 2 and 3, respectively. The average of these surface areas was used to derive the diameters of the individual particles. Assuming the particles to be spherical in shape, the individual particle diameter was calculated to be about 0.01 micron. A portion of sample 2 was analyzed with a Cilas 715 Granulometer. According to this analysis, 90.4% of the particles of sample 2 were less than 1 micron in diameter.

The following analytical sequence was conducted to demonstrate that the precursor product is an intimate mixture comprised substantially of silicon dioxide and carbon.

Sample 2 was analyzed with respect to its elemental components to give the following results: 6.84 wt. % carbon; 1.22 wt. % hydrogen; 0.63 wt. % nitrogen; 0 wt. % sulfur; 53.97 wt. % oxygen; and 41.42 wt. % silicon. The carbon, hydrogen, nitrogen and sulfur weight percentages were obtained by averaging two sets of data from CHNS combustion analysis. The oxygen and silicon percentages were obtained by means of neutron activation analysis.

A substantial amount of the 41.42 wt. % silicon in the sample 2 precursor product was shown to be silicon dioxide by treating the precursor product with hydrofluoric acid, a reagent which is generally selective in its reaction with silicon dioxide. Thus, a one gram portion of sample 2 was treated with 30 cc hydrofluoric acid overnight to remove silicon dioxide. Liquid was filtered off using Teflon ® filter paper (10 micron pore size), leaving a residue which was treated overnight with a second 30 cc amount of hydrofluoric acid. Liquid was filtered off, yielding a second residue which was washed with distilled water and dried in a vacuum oven at 150° C. for several hours. Only 0.075 g of a black powder was recovered, indicating a substantial amount of the precursor product is silicon dioxide. In fact, if all the 41.42 wt. % silicon is present as silicon dioxide, the predicted weight loss is 0.885 g, in good agreement with the experimentally determined weight loss of 0.925 g. The 0.04 g discrepancy is due to the presence of small amounts of moisture in the precursor product and to experimental error.

The remaining 0.075 g black powder was analyzed for carbon and hydrogen using combustion analysis, and was found to contain 85.51 wt. % carbon and 2.29 wt. % hydrogen. Thus, 0.0641 g (85.51% of 0.075 g) of the original 0.0684 g (6.84% of 1 g) carbon was recovered after extraction of silicon dioxide from the precursor product powder.

As per the previous discussion, the precursor product powder of sample 2, analyzed to contain silicon dioxide and carbon, can be heated in an inert atmosphere to yield the desired silicon carbide compound.

That which is claimed is:

1. A method for producing a carbide which comprises the steps of:
    a) establishing a flow into a reaction chamber of a combustible gas mixture consisting essentially of 1) CO and 2) an oxidant selected from the group consisting of air and $O_2$;
    b) combusting the combustible gas mixture in the reaction chamber while injecting a silicon halide and a hydrocarbon into the reaction chamber which has at least a portion of the reaction chamber at a temperature between about 1100° C. and 1650° C. to thereby produce a carbon containing powder;
    c) collecting the powder product of step b) from the reaction chamber;
    d) heating the powder product of step c) to between at least about 1300° C. to about 2400° C. in a substantially inert atmosphere and for a sufficient time to produce said carbide.

2. A method as recited in claim 1 wherein said silicon halide is silicon tetrachloride.

3. A method as recited in claim 1 wherein said hydrocarbon is a $C_1$–$C_9$ hydrocarbon.

4. A method as recited in claim 3 wherein said hydrocarbon is selected from the group consisting of methane, ethane, propane, butane, pentane, hexane, heptane, octane, nonane, ethylene, propylene, acetylene, benzene, toluene, cyclopropane, cyclobutane, cyclopentane, cyclohexane, and mixtures thereof.

5. A method as recited in claim 4 wherein said hydrocarbon is ethylene.

6. A method as recited in claim 1 wherein said silicon halide and hydrocarbon are substantially gaseous as injected into said chamber.

7. A method as recited in claim 1 wherein the silicon halide and the hydrocarbon are injected into said chamber in a direction generally perpendicular to the longitudinal axis of said chamber, and the carbon monoxide and oxidant are injected into said chamber closely adjacent to the upstream end of said chamber in a direction generally parallel to the longitudinal axis of said chamber.

8. A method as recited in claim 7 wherein the powder product of step c) is heated in the substantially inert atmosphere at a temperature of about 1500° C. to about 1800° C. for a time of at least about 15 minutes.

9. A method as recited in claim 8 further comprising heating the product of step d) in an oxygen-containing atmosphere within the temperature range of about 600° C. to about 900° C. for a time of at least about 15 minutes.

10. A method as recited in claim 1 wherein the combustible gas mixture has a molar ratio of CO to $O_2$ of 1:1 to about 3:1.

* * * * *